Aug. 15, 1961 J. MELLEMA 2,996,172
TOOL BOX FOR CONTAINING TOOLS OF VARIOUS
SIZES AND UTILITIES
Filed Dec. 5, 1958 2 Sheets-Sheet 1
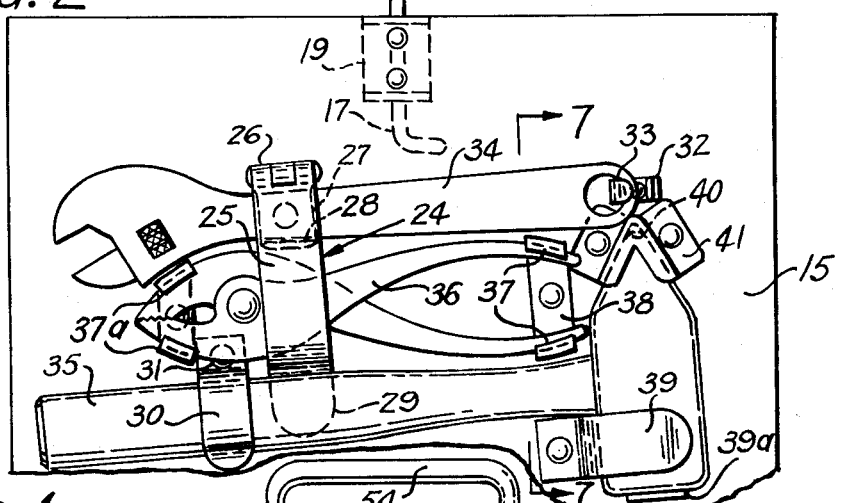
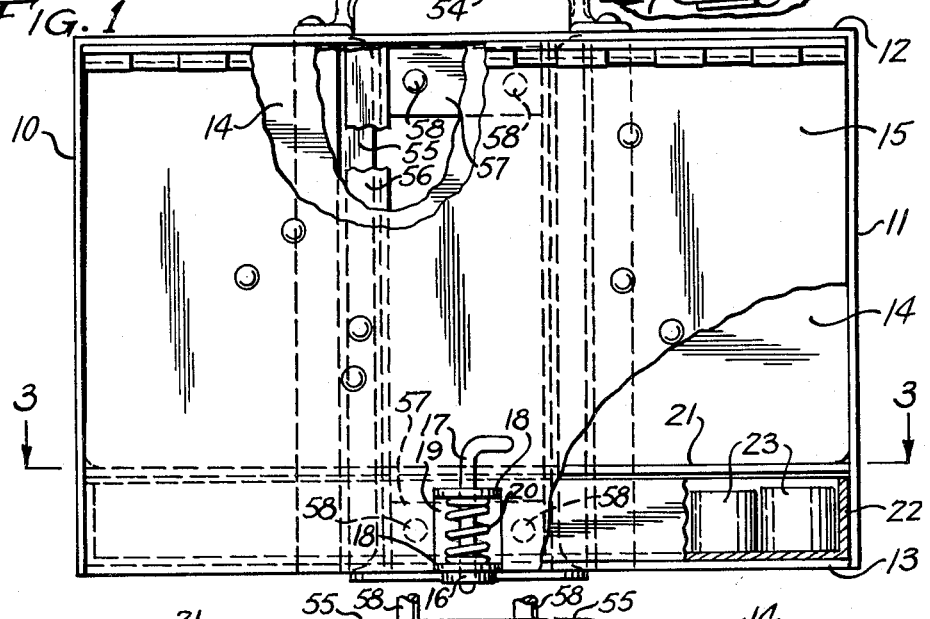
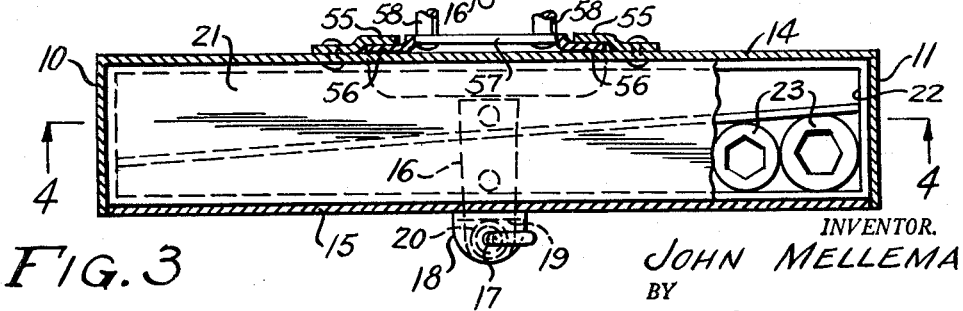
INVENTOR.
JOHN MELLEMA
BY

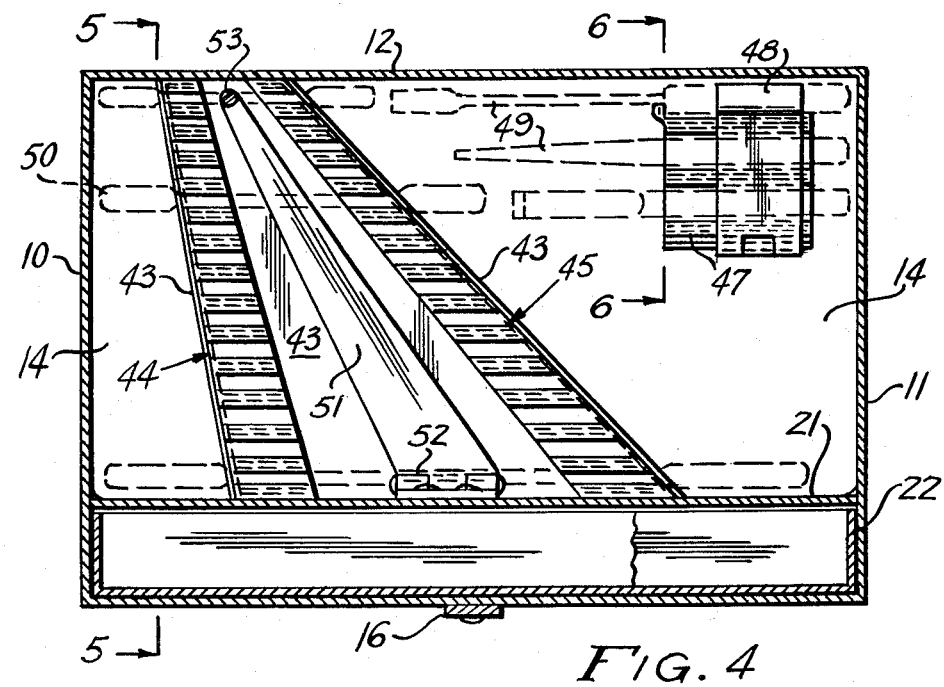
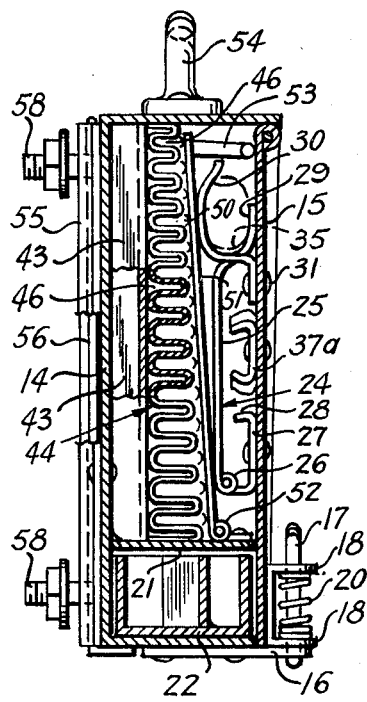

United States Patent Office 2,996,172
Patented Aug. 15, 1961

2,996,172
TOOL BOX FOR CONTAINING TOOLS OF
VARIOUS SIZES AND UTILITIES
John Mellema, Reading, Minn.
Filed Dec. 5, 1958, Ser. No. 778,356
1 Claim. (Cl. 206—16)

This invention relates to a tool box for containing tools in a compact and useful position and particularly to retain tools intactly and readily accessible.

The principal object of the present invention is to provide a box that is of small size, but so arranged with respect to retainers and brackets therein, as to hold a considerable number of tools and other implements necessary for repair work.

Another important object of the invention is to provide an implement box of the character stated, which may be hung on a bracket at various places on a large machine.

Another object of the invention is to provide a tool box which can be readily moved from one large machine to another and properly supported thereon for ready accessibility, adjacent to the part of the machine upon which repair work is to be done.

A further object of the invention is to provide a tool and implement box wherein supporting means are situated in such a manner that tools can be readily reached and returned and a quick observation of the interior of the box will indicate whether all tools are present when starting a job or have been replaced after completing an operation.

These and various other objects and advantages of the invention will become apparent to the reader of the following description.

In the drawings:

FIGURE 1 is a front elevation of the box with portions broken away.

FIGURE 2 is an inside elevational view of the door.

FIGURE 3 is a sectional view taken on line 3—3 of FIGURE 1, and showing the drawer for the wrench sockets.

FIGURE 4 is a vertical section taken on line 4—4 of FIGURE 3.

FIGURE 5 is a fragmentary vertical sectional view taken on line 5—5 of FIGURE 4.

FIGURE 6 is a fragmentary vertical sectional view taken on line 6—6 of FIGURE 4.

FIGURE 7 is a fragmentary section taken on line 7—7 of FIGURE 2.

Referring to the drawing wherein like numerals designate like parts, it can be seen that the tool or implement box in general consists of end walls 10, 11, top and bottom walls 12, 13 and a back wall 14. This box also has a front door or closure wall 15.

The bottom wall has a projecting plate 16 having an opening therein for receiving a slide bolt 17, which operates through a pair of ears 18, 18 on a bracket 19. A coiled compression spring 20 is located between these ears and one end is secured to the bolt 17. The bolt 17 is capable of operating through the lower lug 18 and into the opening of the projecting plate 16 in order to hold the door 15 in closed position, as shown in FIGURE 1.

Just above the bottom of the box is a horizontal wall 21, defining a space within which a drawer 22 is movable and contains wrench sockets 23. This drawer may be partitioned off diagonally to accommodate wrench sockets graduating in sizes.

An important factor of this invention is to provide an arrangement of implement and tool element retainers, so situated as to prevent displacement or undue vibration within the box, when the latter is being transported.

The inside of the lid has a bridge structure 24, disposed as shown in FIGURE 2 and more clearly shown in FIGURE 5. This bridge structure consists of an elongated bar 25 with one end hinged as at 26 to a plate 27, the latter having an outstanding lug 28. The hinge 26 is also located on a projecting part of the plate 27 and the bar 25 extends in spaced relation with respect to the inside of the door 15 (see FIGURE 5).

The free end portion of the bar 25 is curved as at 29 toward the inside of the door.

Numeral 30 denotes a spring clip located adjacent the curved portion 29 and being secured as at 31 to the door 15.

The inside of the door 15, as shown in FIGURE 2 and also in FIGURE 7 is provided with a retainer hook 32, the hook portion denoted by numeral 33 and over this is engaged the apertured end portion of a wrench 34.

The neck portion of this wrench is disposed between the bar 25 and the plate 27 and is held against slipping by the lug 28, that is, when the bar 25 is disposed in the position shown in FIGURE 5, with the handle portion 35 of a hammer disposed within the confines of the clip 30 and bearing against the curved end portion 29 of the bar 25.

The jaws of the pliers rest in lugs 37a as is clearly shown in FIGURE 2. These pliers, denoted by numeral 36 have their end portions engaged within lugs 37, the lugs 37 being located on a bracket 38. The bar further holds the pliers in place as shown in FIGURE 2.

As can be seen in FIGURE 2, a spring clip 39 is attached to the inside of the door 15 and engages over a portion of the hammerhead, while (if the hammerhead is of the tapered end portion type, has its end portion fitting between an inverted V-shaped formation 40, which has flanges 41 welded or otherwise secured to the door 15. The short shelf 39a projects from the inside of the door 15 and supports the head portion of the hammer, as shown in FIGURE 2.

Obviously, the tools as is shown in FIGURE 2 are fixed in the position illustrated.

Firstly, the bar 25 is swung outwardly and the wrench 34 has its apertured end engaged over the hook 33 and situated within the pocket defined by the plate 27 and lug 28. After this, the pliers are placed against the lid 15 after which the bar 25 is swung over these tools, so that its curved portion bears against the inside of the door 15.

The hammer is now disposed into position by placing its tapered end within the converging structure 40, swinging the head downwardly to fit into the spring clip 39 and at the same time bringing the handle up under the spring clip 30 and over the curved portion 29 of the bar 25.

This secures all of the implements firmly in place, so that they cannot become displaced from the inside of the door.

Situated within the box proper and suitably secured thereto is a protruding sheet metal wall 43, and secured to this are two converging undulated strips 44, 45. These strips are undulated and are of spring material, so as to form recesses 46 for the reception of screw drivers, chisels and other items or implements that may be required in the repair of machinery. With the undulated strips 44, 45 assuming the position shown in FIGURE 4, there is a marked void in space at the upper right-hand portion of the interior of the box and this is utilized by securing to the wall 14 an undulated plate 47. Numeral 48 denotes a hinged bar which is disposable over the grooves of the undulated plate 47 to hold various tools 49 in place, and it can be seen, that when the lid 15 is moved to closed position, as shown in FIGURE 6 the clip 39, holding the hammerhead will bear against the hinged plate 48, thus holding the tools firmly in place against vibration.

Now referring again to the undulated strips 44, 45 for holding various tools or implements 50, numeral 51 denotes an elongated bar, hinged as at 52, to the top of the partition 21. This bar engages the medial portions of the tools 50 and prevents displacement of the tools from the undulated strips 44, 45, by reason of the presence of an arm 53 projecting outwardly from the free end of the bar and which engages against the inside of the door 15, when the door is in closed position. This forcing backwardly of the bar 51 holds the tools 50 firmly in place against movement or vibration.

The top 12 of the box is provided with a handle 54, and the back of the box is provided with outstanding flanges 55, 55 which engage over flanges 56, 56 of a wall bracket 57, secured in place by rivets or bolts 58. In referring to this bracket 58 as a wall bracket, it must be understood that this bracket can be attached to machine frames.

While the foregoing description sets forth the invention in specific terms, it is to be understood that numerous changes in the shape, size and materials may be resorted to, without departing from the spirit and scope of the invention as claimed hereinafter.

Having described the invention what is claimed as new is:

In a tool box, a container for tools, a closure for the container, a pair of spaced apart angularly disposed rows of inclined graduated spring retainer elements in the box for supporting tools and implements, a hinged bar disposed between said rows of elements adapted to engage over the tools extending between aligned elements of said rows of elements to prevent displacement from the retainer elements, a second hinged bar for holding one or more tools in place against the inside of the closure hingedly connected to said closure, said second bar being provided with an offset portion adjacent the inside of the closure, spring clips secured to the inside of said closure for holding a portion of a tool against the inside of the closure, the offset portion or said second bar engaging the underside of said last-mentioned tools to retain said last-mentioned tools on the closure against vibration, an arm extending from the free end of the first bar within the container engaging the closure when the latter is closed firmly to hold the bar within the box against the tools extending between the spring retainer elements.

References Cited in the file of this patent

UNITED STATES PATENTS

| | | |
|---|---|---|
| 1,748,841 | Hermani | Feb. 25, 1930 |
| 1,914,276 | Moore | June 13, 1933 |
| 2,572,706 | Eichholz | Oct. 23, 1951 |
| 2,589,593 | Anderson et al. | Mar. 18, 1952 |
| 2,685,363 | Falk et al. | Aug. 3, 1954 |

FOREIGN PATENTS

| | | |
|---|---|---|
| 354,937 | Germany | June 17, 1922 |
| 764,061 | Great Britain | Dec. 19, 1956 |
| 858,393 | France | Nov. 23, 1940 |